United States Patent
Engelen et al.

(10) Patent No.: US 11,094,091 B2
(45) Date of Patent: Aug. 17, 2021

(54) SYSTEM FOR RENDERING VIRTUAL OBJECTS AND A METHOD THEREOF

(71) Applicant: SIGNIFY HOLDING B.V., Eindhoven (NL)

(72) Inventors: Dirk Valentinus René Engelen, Heusden-Zolder (BE); Dzmitry Viktorovich Aliakseyeu, Eindhoven (NL); Jérôme Eduard Maes, Eindhoven (NL); Bartel Marinus van de Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/618,679

(22) PCT Filed: May 29, 2018

(86) PCT No.: PCT/EP2018/063995
§ 371 (c)(1),
(2) Date: Dec. 2, 2019

(87) PCT Pub. No.: WO2018/219900
PCT Pub. Date: Dec. 6, 2018

(65) Prior Publication Data
US 2020/0126264 A1    Apr. 23, 2020

(30) Foreign Application Priority Data
Jun. 1, 2017    (EP) ..................................... 17173982

(51) Int. Cl.
*G06T 11/00*    (2006.01)
*G06T 7/70*    (2017.01)
*H05B 47/175*    (2020.01)

(52) U.S. Cl.
CPC ................ *G06T 11/00* (2013.01); *G06T 7/70* (2017.01); *H05B 47/175* (2020.01)

(58) Field of Classification Search
CPC .................................. G06T 11/00; G06T 7/70
(Continued)

(56) References Cited

U.S. PATENT DOCUMENTS

2014/0043321 A1    2/2014  Matjasko et al.
2014/0343699 A1 *  11/2014 Engelen .............. H01L 51/5268
                                                    700/90
2016/0225186 A1 *  8/2016  Aliakseyeu ........ G01C 21/3647

FOREIGN PATENT DOCUMENTS

EP          1883052 B1    11/2015
WO      2009095833 A1     8/2009
(Continued)

OTHER PUBLICATIONS

Yang Wang, et al., "Estimation of Multiple Directional Light Sources for Synthesis of Mixed Reality Images," State University of New York At Stony Brook, NY, Proceedings of the 10th Pacific Conference on Computer Graphics and Applications 2002 (10 Pages).

*Primary Examiner* — Thomas J Lett

(57) ABSTRACT

A method (400) of rendering virtual objects is disclosed. The method (400) comprises: detecting (402) light (122) emitted by a lighting device (120), which light (122) comprises an embedded code representative of a property of the lighting device (120), obtaining (404) a virtual object, determining (406) an appearance and/or a behavior of the virtual object based on the property of the lighting device (120), and rendering (408) the virtual object on an image rendering device (104) according to the determined appearance and/or behavior.

14 Claims, 4 Drawing Sheets

(58) Field of Classification Search
USPC .......................................................... 345/633
See application file for complete search history.

(56) References Cited

FOREIGN PATENT DOCUMENTS

WO      2016071244 A2    5/2016
WO    20160206991 A1   12/2016

* cited by examiner

1

SYSTEM FOR RENDERING VIRTUAL OBJECTS AND A METHOD THEREOF

CROSS-REFERENCE TO PRIOR APPLICATIONS

This application is the U.S. National Phase application under 35 U.S.C. § 371 of International Application No. PCT/EP2018/063995, filed on May 29, 2018, which claims the benefit of European Patent Application No. 17173982.4, filed on Jun. 1, 2017. These applications are hereby incorporated by reference herein.

FIELD OF THE INVENTION

The invention relates to a method of rendering virtual objects and to a computer program product for executing the method. The invention further relates to a system for rendering virtual objects.

BACKGROUND

Recent developments in virtual reality (VR) and augmented reality (AR) enable users to interact with virtual objects. These virtual objects may be displayed as an overlay on the physical world, for example on a smartphone or on AR-glasses. This technology enables many different types of applications, for example position-based treasure hunt games, keeping of virtual pets, etc. Recent developments in AR and coded light technology enable new paradigms for interaction with and generation of such virtual objects.

US 20140043321 A1 discloses visualizing objects in a simulated environment. The object may be rendered as an overlay on the actual environment. An environment database may store environment data representing physical properties, such as lighting conditions, associated with an environment to be simulated.

SUMMARY OF THE INVENTION

It is an object of the present invention to provide a new paradigm for the generation of virtual objects.

According to a first aspect of the present invention, the object is achieved by a method of rendering virtual objects, the method comprising:

detecting light emitted by a lighting device, which light comprises an embedded code representative of a property of the lighting device, obtaining a virtual object, determining an appearance and/or a behavior of the virtual object based on the property of the lighting device, and rendering the virtual object on an image rendering device according to the determined appearance and/or behavior.

By determining the appearance and/or the behavior of the virtual object based on the property of the lighting device, the appearance and/or behavior of the virtual object may be different for every lighting device. When, for example, the property is representative of the type of lighting device (e.g. an LED strip vs an LED bulb), the virtual object will be rendered according to the type of lighting device. This is beneficial, for example when the virtual object is a virtual character, because the virtual character will be rendered in accordance with the type of lighting device (e.g. a virtual snake character may be rendered elongated when the lighting device is an LED strip, whereas the same virtual snake character may be rendered in a more compact form when the lighting device is an LED bulb).

The lighting device emits light comprising an embedded code representative of a property of the lighting device. A user, operating a (mobile) device such as a smartphone or smartglasses, may position the mobile device such that its light detector (e.g. a camera or a photodiode) is in line of sight of the light source, whereupon the embedded code may be detected, the property may be retrieved from the embedded code and the appearance and/or behavior of the virtual object may be determined based thereon. This enables a user to point the light detector of the mobile device towards different lighting devices, thereby changing the appearance and/or behavior of the virtual object and gaining control over how the virtual object will be rendered.

The property of the lighting device may be representative of a configuration/distribution of one or more light sources in the lighting device. Additionally or alternatively, the property of the lighting device may be representative of the (current) light setting and/or light distribution of the light emitted by the lighting device. Additionally or alternatively, the property of the lighting device may be representative of a spatial position of the lighting device. The property of the lighting device may, for example, relate to at least one of:

a beam shape of the light emitted by the lighting device,
a shape of the lighting device (120),
an identifier of the lighting device (120),
a type of the lighting device,
a light setting of the lighting device, and
a location and/or an orientation of the lighting device.

In embodiments, the embedded code may be representative of different properties of the lighting device. This may be beneficial, because it further specifies the appearance and/or the behavior of the virtual object.

The appearance of the virtual object relates to how the virtual object looks. The appearance of the virtual object may, for example, relate to at least one of:

a size of the virtual object,
a shape of the virtual object,
a color of the virtual object, and
a transparency of the virtual object.

The behavior of the virtual object relates to a spatial and temporal behavior of the virtual object in the virtual environment. The behavior of the virtual object may, for example, relate to at least one of:

a movement of the virtual object,
a movement speed of the virtual object,
a trajectory of the virtual object, and
a lifetime of the virtual object.

The method may further comprise detecting light emitted by a second lighting device, which light comprises a second embedded code representative of a second property of the second lighting device, and the appearance and/or the behavior of the virtual object may be based on the property of the lighting device and the second property of the second lighting device. Thus, the appearance and/or the behavior of the virtual object may be based on the properties of multiple lighting devices. For instance, a first property of a first lighting device may be a first light setting (e.g. red light) and a second property of a second lighting device may be a second light setting (e.g. yellow light), and, based thereon, the virtual object may be rendered in, for example, an orange color or in a red/yellow color pattern.

The image rendering device may be comprised in a mobile device comprising an image capture device, and the method may further comprise:

identifying an object in an image captured by the image capture device, determining a first position of the object in the image, and rendering the virtual object at a second position on the image rendering device based on the first position of the object in the image. Thus, the object can be used as an anchor for rendering the virtual object. This is beneficial, because it enables rendering the virtual object at a position relative to the position of the object. The relation between the first position and the second position may be predefined. The second position may for example be located nearby the first position, remote from the first position, or be the same as the first position.

The image rendering device may be comprised in a mobile device comprising an image capture device, and the method may further comprise:

determining a first position of the object in an image captured by the image capture device, and rendering the virtual object at a second position on the image rendering device based on the first position of the object in the image. The relation between the first position and the second position may be predefined. Thus, the lighting device can be used as an anchor for rendering the virtual object. This is beneficial, because it enables rendering the virtual object at a position relative to the position of the lighting device. The relation between the first position and the second position may be predefined. The second position may for example be located nearby the first position, remote from the first position, or be the same as the first position.

The method may further comprise:

determining a third position of the second lighting device in the field of view of the image capture device, determining a movement trajectory for the virtual object based on the first position of the lighting device and the third position of the second lighting device, and rendering the virtual object on the image rendering device according to the determined movement trajectory.

This enables rendering of a virtual object that moves according to a trajectory in relation to the lighting devices, which improves the interaction between the virtual object and the lighting devices.

The method may further comprise:

controlling the lighting device such that it emits light comprising an updated embedded code, which updated embedded code is representative of an instruction for a change of the appearance and/or the behavior of the virtual object, and detecting the updated embedded code, determining an updated appearance and/or an updated behavior of the virtual object based on the updated embedded code, and rendering the virtual object on the image rendering device according to the updated appearance and/or updated behavior.

This enables a (mobile) device that detects the updated code to change the appearance and/or the behavior of the virtual object. This further enables a device which controls the lighting device to determine how the virtual object will be rendered on a device that receives the updated embedded code.

The image rendering device may, for example, be a display of a mobile device, and the virtual object may be rendered on the display. Additionally, the virtual object may be rendered as an overlay on a view of a physical environment wherein the mobile device is located. The mobile device may comprise an image capturing device configured to capture images. The method may further comprise the steps of rendering the images captured by the image capture device on the display, and rendering the virtual object on the display as an overlay on the images. Alternatively, the mobile device may be smart glasses, for example augmented/mixed reality smart glasses, and the image rendering device may be a projector configured to project the virtual object on the smart glasses, or directly on the retina of the user, as an overlay on a view of the physical environment wherein the mobile device is located. In the context of the present invention, the term "view" relates to a user's (field of) view of a part of the physical environment that is visible for the user operating the mobile device (i.e. the AR device) through the mobile device (e.g. on the image rendering device or through a set of smart glasses). This may, for example, be an image of the physical environment that is being rendered on the image rendering device, or be the physical environment that is visible through, for example, a pair of smart glasses.

The step of obtaining the virtual object may comprise selecting the virtual object from a memory based on the property of the lighting device. The virtual object may be (first) selected based on the property of the lighting device, and its appearance and/or behavior may be (second) determined based on the property of the lighting device, or based on another property of the lighting device.

According to a second aspect of the present invention, the object is achieved by a computer program product for a computing device, the computer program product comprising computer program code to perform the method of any one of the above-mentioned claims when the computer program product is run on a processing unit of the computing device.

According to a third aspect of the present invention, the object is achieved by a system for rendering virtual objects, the system comprising:

an image rendering device, a light detector configured to detect light emitted by a lighting device, which light comprises an embedded code representative of a property of the lighting device, and a processor (102) configured to obtain a virtual object, determine an appearance and/or a behavior of the virtual object based on the property of the lighting device, and render the virtual object on the image rendering device according to the determined appearance and/or behavior.

The system may further comprise an image capture device, and the processor may be further configured to determine a position of the lighting device and/or an object in a field of view of an image capture device, and to determine where to render the virtual object on the image rendering device based on the position of the lighting device and/or the object in the field of view of the image capture device.

It should be understood that the claimed computer program product and the system may have similar and/or identical embodiments and advantages as the claimed method.

BRIEF DESCRIPTION OF THE DRAWINGS

The above, as well as additional objects, features and advantages of the disclosed systems, mobile devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
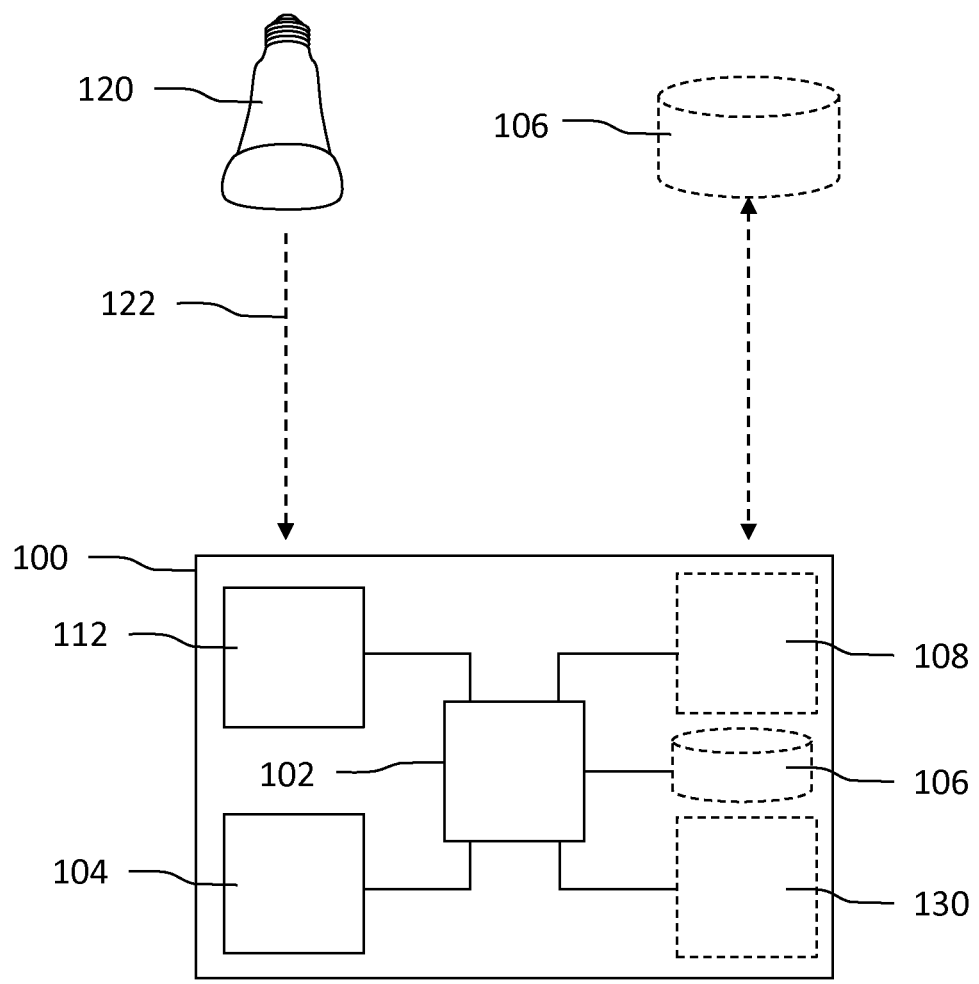
FIG. 1 shows schematically an embodiment of a system for rendering virtual objects.

FIG. 1 shows schematically an embodiment of a system for rendering virtual objects. The system comprises a mobile device 100 comprising an image rendering device 104, a light detector 112 configured to detect light 122 emitted by a lighting device 120, which light 122 comprises an embedded code representative of a property of the lighting device 120 and a processor 102. The processor 102 is configured to obtain a virtual object, determine an appearance and/or a behavior of the virtual object based on the property of the lighting device 120, and to render the virtual object on the image rendering device 104 according to the determined appearance and/or behavior.

The processor 102 (e.g. a microcontroller, circuitry, a microchip, etc.) is configured to obtain a virtual object. The processor 102 may select the virtual object from a memory 106. Additionally or alternatively, the embedded code may comprise instructions for the mobile device 100 for rendering a specific virtual object and/or the embedded code may comprise data representative of the virtual object (e.g. data representative of a 2D/3D model of the virtual object). The mobile device 100 may comprise the memory 106. Alternatively, the mobile device 100 may comprise a communication unit 108 for communicating with a remote memory 106. The communication unit 108 may be further configured for communicating with other devices, such as the lighting device 120 in order to, for example, control the lighting device 120. The communication unit 108 of the mobile device 100 may be configured to communicate via one or more communication protocols with other devices. Various communication protocols may be used by the communication unit 108, for example Ethernet, Bluetooth, Wi-Fi, Li-Fi, 3G, 4G or ZigBee.

The memory 106 may comprise a virtual object database configured to store a plurality of virtual objects. The processor 102 may obtain/select the virtual object based on one or more selection criteria. The selection may, for example be dependent on the application that is running on the mobile device 100. For instance, a (game) application may determine which virtual object should be selected (and rendered) in a current (game) context. In another example, the selection of the virtual object may be based on the property of the lighting device 120. Next, the appearance and/or behavior may be determined based on that property, or based on another property of the lighting device 120. For instance, the type of lighting device 120 may determine which virtual object is selected (e.g. a first virtual object for an LED strip and a second virtual object for a LED tube) and the virtual object's behavior may be determined based on the type or on another property such as the light setting of the lighting device 120. In another example, the selection of the virtual object may be based on a user input indicative of a selection of the virtual object. The mobile device 100 may for example comprise a user interface configured to receive user input indicative of a selection of a virtual object, whereupon its appearance and/or behavior are determined based on the property of the lighting device 120.

The processor 102 is further configured to determine an appearance and/or a behavior of the virtual object based on the property of the lighting device 120. The processor 102 may determine the appearance and/or the behavior of the virtual object by accessing a lookup table (which may be stored in the memory 106), which lookup table may store associations between properties and appearances and/or behaviors of specific virtual objects. The processor 102 may compare the property retrieved from the embedded code with the properties stored in the lookup table, and select an appearance and/or a behavior of the virtual object if the property corresponds to a stored property in the lookup table. Additionally or alternatively, the processor 102 may alter a selected virtual object based on the property. The property may, for example, relate to a current light setting (e.g. a brightness and/or a color) of the lighting device 120, and the processor 102 may change the color of (a part of) the selected virtual object based on the current light setting. Additionally or alternatively, the processor 102 may determine where to render the virtual object on the image rendering device 104 based on the property. The property may, for example, relate to a beam shape of the light emitted by the lighting device 120, and the processor 102 may determine to render the virtual object at a location such that, from a user point of view, the virtual object appears to be located in the beam of light.

Figure 2A:
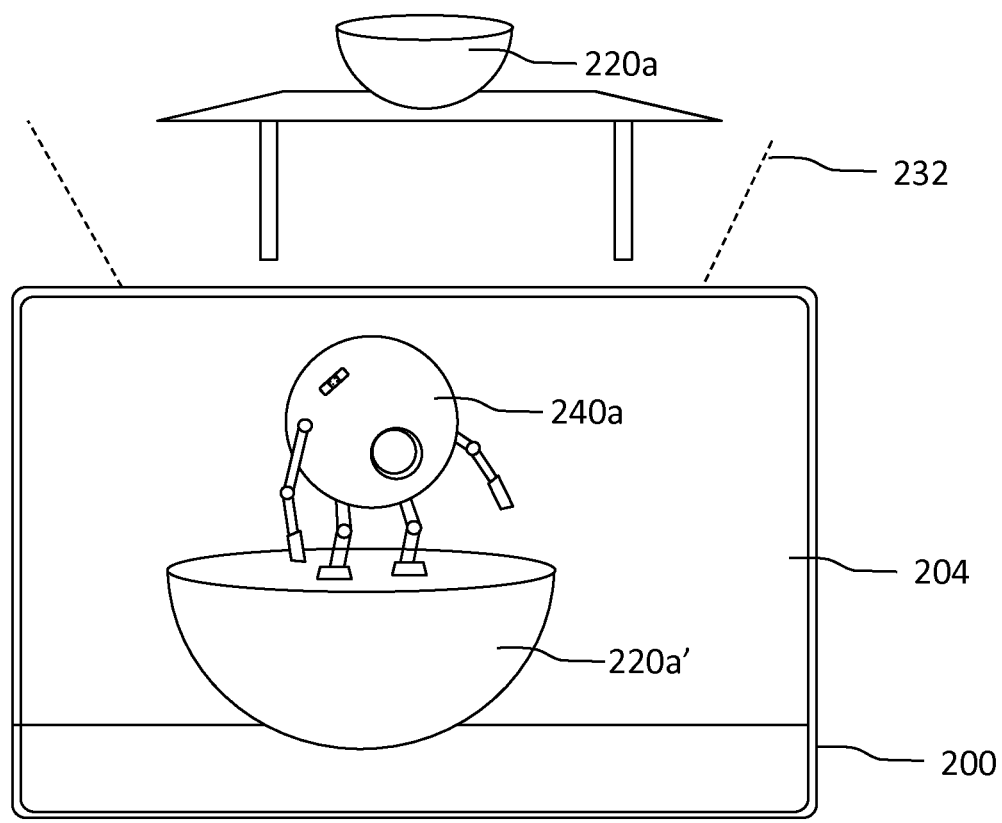
FIGS. 2a, 2b and 2c show examples of how the appearance and/or behavior of a virtual object may be based on a property of a light source.
Figure 2B:
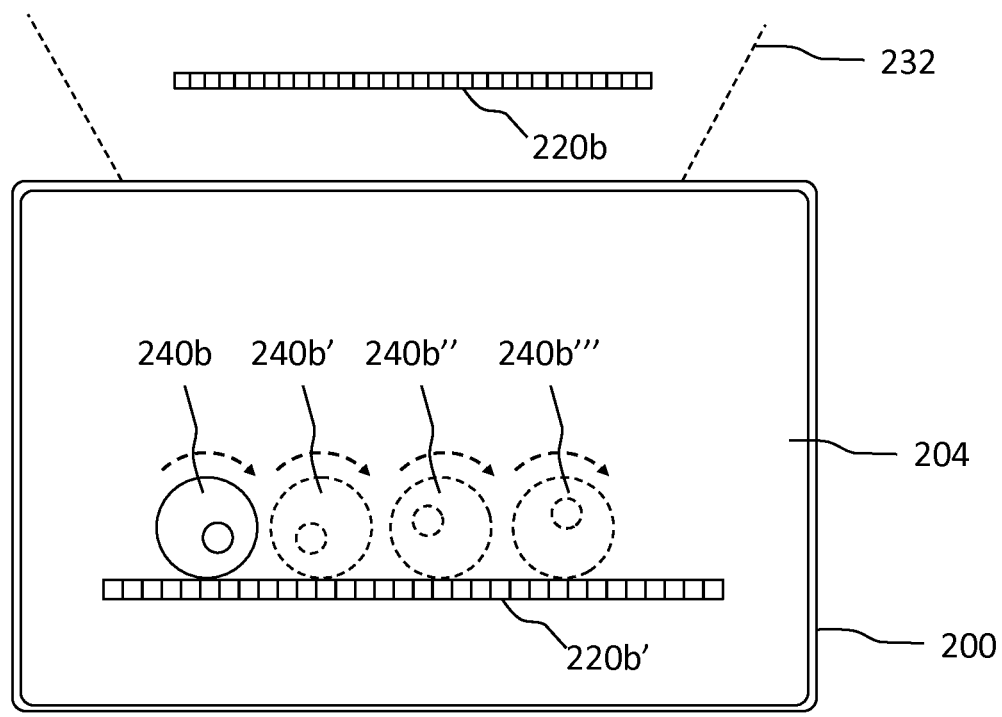
Figure 2C:
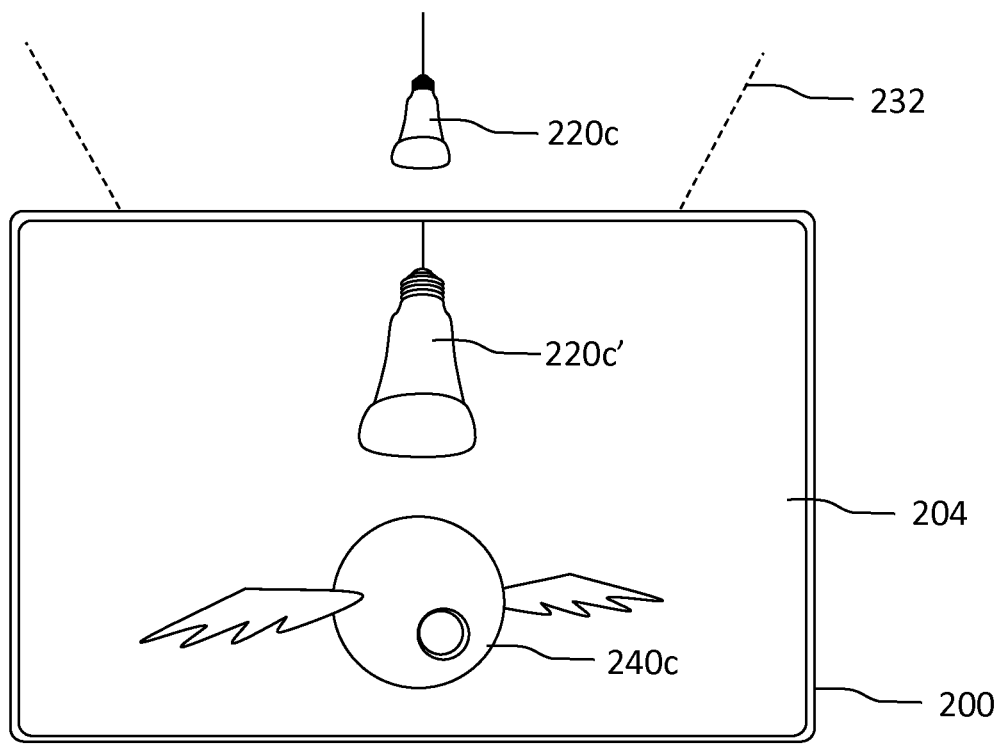

FIGS. 2a-2c show examples of how a virtual object (in these examples a virtual character) is rendered on a display 204 of a mobile device 200 as an overlay on an image captured by an image capture device of the mobile device 200. In FIG. 2a, the lighting device 220a is a (portable) tabletop lighting device. The lighting device 220a may emit light comprising an embedded code indicative of its type (e.g. a Philips Hue Go lamp). Based on this type, the processor 102 (not shown in FIG. 2a) may determine the appearance and the behavior of the virtual character 240a (e.g.: appearance: default appearance; behavior: dormant on top of the lighting device 220a'), and render the virtual object accordingly as an overlay on an image of the lighting device 220a captured by an image capture device (not shown) of the mobile device 200.

In another example, referring to FIG. 2b, the lighting device 220b is a linear lighting device. The lighting device 220b may emit light comprising an embedded code indicative of its type (e.g. an LED strip). Based on this type, the processor 102 (not shown in FIG. 2b) may determine the appearance and the behavior of the virtual character 240b (e.g.: appearance: 'ball' appearance; behavior: rotational movement across the lighting device 220b'). The processor 102 may render the virtual object 240b, 240b', 240b'', 240b' as an overlay on top of one or more images of the lighting device 220b captured by an image capture device (not shown) of the mobile device 200. The processor may render the virtual object 240b, 240b', 240b'', 240b''' over time such that it appears to a user that the virtual object 240b, 240b', 240b'', 240b' is rolling across the lighting device 220b. Additionally, the processor may be further configured to determine which light sources of the lighting device 220b are on (e.g. based on signals received from the lighting device 220b, based on control signals sent to the lighting device 220b, based on image analysis of one or more images captured of the lighting device 220*b*, etc.) and determine the movement speed of the virtual object 240*b* based thereon. The light sources may, for example, be turned on and off sequentially, and the virtual object 240*b* may move along with the light sources that are turned on.

In another example, referring to FIG. 2*c*, the lighting device 220*c* is a light bulb. The lighting device 220*c* may emit light comprising an embedded code indicative of its type (e.g. an LED bulb). Based on this type, the processor 102 (not shown in FIG. 2*c*) may determine the appearance and the behavior of the virtual character 240*c* (e.g.: appearance: 'flying' appearance; behavior: flying movement). The processor 102 may render the virtual object 240*c* as an overlay on top of one or more images of the lighting device 220*c* captured by an image capture device (not shown) of the mobile device 200. The processor may render the virtual object 240*c* over time such that it appears to a user that the virtual object virtual object 240*c* is 'flying' underneath the lighting device 220*c*.

The mobile device 100 further comprises a light detector 112 configured to detect the light 122 emitted by the lighting device 120, which light 122 comprises the embedded code representative of the property of the lighting device 120. The light detector 112 may, for example, be a photodiode or a camera. The code may be created by any known principle of embedding a code in light, for example by controlling a time-varying, modulated current to the lighting device to produce variations in the light output 122, by modulating the amplitude and/or the duty-cycle of the light pulses, etc.

The processor 102 is configured to retrieve the embedded code from the light 122. The code may comprise information about the lighting device 120. The code may comprise an identifier of the lighting device 120, which may enable the processor 102 to identify the lighting device 120 and to determine one or more properties of the lighting device 120 by accessing a database storing associations between identifiers of lighting devices and their properties. The database may be stored in the mobile device 100 and be directly accessible by the processor 102, or be stored in the memory 106 or in a remote device such as a lighting control system and be accessible by the processor 102 via, for example, the communication unit 108. The identifier of the lighting device 120 may be compared to stored identifiers, and if the identifier corresponds to a stored identifier, the one or more properties associated with that stored identifier may be retrieved by the processor 102.

Additionally or alternatively, the code may comprise the property of the lighting device 120, which enables the processor 102 to retrieve the one or more properties of the lighting device 120 directly from the code. The lighting device 120 may comprise/be connected to a controller configured to determine which property is comprised in the code. The controller may be further configured to receive control commands indicative of a selection of a specific property. The control commands may, for example, be received from (an application running on) the mobile device 100. The processor 102 of the mobile device 100 may be further configured to communicate a control command to the lighting device to request the controller of the lighting device 120 to emit light comprising a code representative of a specific property.

The property of the lighting device 120 may for example relate to a beam shape and/or beam size of the light emitted by the lighting device 120. The beam of light may have a specific shape (e.g. a narrow shape) which enables the processor 102 to determine/select an appearance (e.g. an elongated shape) and/or a behavior (e.g. a movement trajectory within/along the beam) of the virtual object, and render the virtual object accordingly.

The property of the lighting device 120 may for example relate to an identifier or a type of the lighting device 120. The lighting device 120 may be of a specific type (e.g. a chandelier comprising a plurality of individual light sources) which enables the processor 102 to determine/select an appearance (e.g. multiple virtual objects such as one virtual object for each light source) and/or a behavior (e.g. a random movement within a space occupied by the chandelier) of the virtual object(s), and render the virtual object(s) accordingly.

The property of the lighting device 120 may for example relate to a shape of the lighting device 120. The lighting device 120 may have a specific design or shape. The lighting device may for example have a lamp shade in the shape of a moon. The processor 102 may determine/select an appearance (e.g. a human wearing a space suit) and/or a behavior (e.g. a movement as if the human is weightless) of the virtual object(s), and render the virtual object(s) accordingly.

The property of the lighting device 120 may for example relate to a light setting of the lighting device 120. The lighting device 120 may emit a specific light setting (e.g. red light that is being dimmed over time) which enables the processor 102 to determine/select an appearance (e.g. parts of the object may be red and the object's size may correspond to the dim level) and/or a behavior (e.g. a lifetime of the object may correspond to the dim level) of the virtual object, and render the virtual object accordingly.

The property of the lighting device 120 may for example relate to a location and/or an orientation of the lighting device 120. If, for example, a light bulb is located at the ceiling, the virtual object may have wings (appearance) and fly (behavior), whereas when the same light bulb is located at ground level, the virtual object may have legs (appearance) and crawl (behavior). If, for example, a light bulb is oriented upwards, the virtual object may be rendered such that it moves upwards (behavior), whereas when the same light bulb is oriented downwards, the virtual object may be rendered such that it moves downwards (behavior).

It should be understood that the above-mentioned properties and their corresponding appearances and/or behaviors are mere examples, and that the skilled person will be able to design alternatives without departing from the scope of the appended claims.

The processor 102 is configured to render the virtual object on the image rendering device 104. The processor 102 may render the virtual object on the image rendering device 104 continuously, upon detection of the embedded code, or only while the embedded code is (continuously) being detected. The processor 102 may render the virtual object irrespective of the physical environment wherein the mobile device 100 is present. Alternatively, the processor 102 may be configured to render the virtual object as an overlay on top of a view of the physical environment to augment the physical environment.

The mobile device 100 may be a smartphone, tablet pc, smartwatch, smartglasses, etc., comprising a display. The mobile device 100 may comprise an image capture device (e.g. a (depth) camera). The processor 102 may be configured to render images captured by the image capture device on the display of the mobile device 100. The processor 102 may further render the virtual object on the image rendering device 104 according to the determined appearance and/or behavior. Alternatively, the mobile device 100 may be a pair of smartglasses comprising one or more glasses comprising a transparent element. The processor 102 may be configured to render the selected virtual object 402*b* on the transparent element. The image rendering device 104 may be a projector configured to project the virtual object on at least one of the one or more smartglasses, or directly on the retina of the user, as an overlay on a view of the physical environment wherein the mobile device is located.

The virtual object may be any type of virtual object. Examples of virtual objects include but are not limited to inanimate objects such as virtual furniture, buildings and plants, animate objects such as (game) characters and animals, signage, etc.

The lighting device 120 may be any type of lighting device configured to receive lighting control commands. The lighting device 120 may be arranged for providing general lighting, task lighting, ambient lighting, atmosphere lighting, accent lighting, indoor lighting, outdoor lighting, etc. The lighting device 120 may be installed in a luminaire or in a lighting fixture or may be a standalone device such as an LED strip, etc. The lighting device 120 may be comprised in a portable lighting device (e.g. a hand-sized device, such as an LED cube, an LED sphere, an object/animal shaped lighting device, etc.) or a wearable lighting device (e.g. a light bracelet, a light necklace, etc.).

The mobile device 100 may further comprise an image capture device 130 (such as a camera, a 3D depth camera, etc.). The image capture device 130 may be configured to capture images of the environment. Additionally, the image capture device 130 may function as the light detector 112 and may be configured to detect the code embedded in the light 122. The processor 102 may be further configured to analyze the images captured by the image capture device 130. The processor 102 may, for example, identify objects (e.g. furniture, toys, devices, animals, plants, (building) infrastructure, etc.) in the images. Additionally or alternatively, the processor 102 may be configured to identify lighting devices 120 in the images. The processor 102 may be further configured to analyze the images to determine a position of an object and/or a lighting device 120 in the images, and therewith in the field of view 232, 332 of the image capture device 130. The processor 102 may further determine a (second) position for the virtual object in the images relative to object and/or the lighting device 120 in the field of view 232, 332 of the image capture device 130, and to render the virtual object on the image rendering device based on the position (and therewith render the virtual object as an overlay on top of the view of the physical environment). The processor 102 may, for example, render the virtual object next to the lighting device 120/object, on top of the lighting device 120/object, etc. It should be understood that the processor 102 may also use a remote processing system for analyzing the images.

The light detector 112 may be further configured to detect light emitted by a second lighting device, which light comprises a second embedded code representative of a second property of the second lighting device. The processor 102 may be further configured to determine the appearance and/or the behavior of the virtual object based on the property of the lighting device 120 and on the second property of the second lighting device. For instance, a first property of a first lighting device may be related to a first position of the first lighting device (e.g. in the ceiling) and a second property of a second lighting device may be related to a second position of the second lighting device (e.g. at ground level), and the processor 102 may be configured to select/determine a movement trajectory of the virtual object such that it moves between the two lighting devices.

Figure 3:
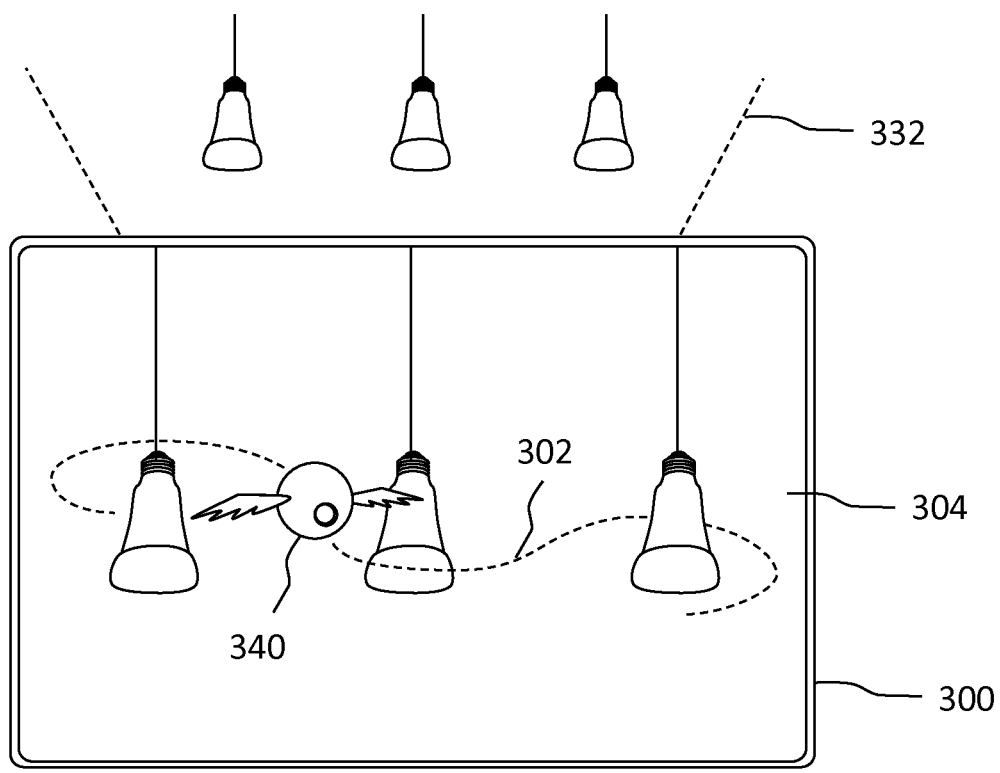
FIG. 3 shows schematically how a movement trajectory may be determined based on the positions of multiple lighting devices.

FIG. 3 illustrates an example wherein a movement trajectory 302 of a virtual object 340 is based on the positions of a plurality of lighting devices in the field of view 332 of an image capture device (not shown in FIG. 3). Each of the three lighting devices may emit light comprising a code indicative of a property. The property may be the same for each of the lighting devices; the property may for example relate to the type of lighting device (e.g. a (hanging) LED bulb). Alternatively, the property may be different for each of the lighting devices, and relate to their position relative to the space (e.g. sets of coordinates relative to the space) or to each other (e.g. left, center, right). The processor (not shown in FIG. 3) may determine the movement trajectory 302 of the virtual object 340 based on the property. This may for example be based on the fact that all three lighting devices are (hanging) LED bulbs and that they are in field of view of the image capture device of the mobile device 300, or for example based on their relative positions provided via the embedded codes and that they are in field of view of the image capture device of the mobile device 300. The processor may render the virtual object on display 304 according to the determined movement trajectory 302.

In embodiments, the processor 102 may be further configured to receive a mapping of a virtual environment on the physical environment wherein locations in the virtual environment correspond to locations in the physical environment. The processor 102 may receive this mapping from a further device, such as a remote server. Additionally or alternatively, the processor 102 may be further configured to generate the mapping, for example based on images received from an image capturing device 130 and/or based on building information (e.g. a 2D/3D building layout). The processor 102 may apply image processing algorithms to determine locations of objects and the layout of the physical environment (which may, for example, be based on depth information received from a 3D camera/scanner) in order to generate the mapping of the virtual environment on the physical environment. The mapping may, for example, be a mapping of virtual coordinates onto physical coordinates in a 3D space. The processor 102 may be further configured to determine a position of the mobile device 100 in the physical environment, for example, based on positioning signals received from an (indoor) positioning system. The property of a lighting device 120 may be representative of the location of the lighting device 120 in the physical environment. This further enables the processor 102 to position the lighting device 120 in the virtual environment. This in turn enables the processor 102 to determine the virtual location/trajectory of the virtual object in the virtual environment and to render the virtual object accordingly in the virtual environment as an overlay on top of the physical environment.

In embodiments, the lighting device 120 may be controlled such that it emits light comprising an updated embedded code, which updated embedded code is representative of an instruction for a change of the appearance and/or the behavior of the virtual object. The lighting device 120 may for example be controlled by a controller of the lighting device 120, by a further device such as a remote server, by the processor 102 of the mobile device 100, etc. This enables further control of the appearance and/or the behavior of the virtual object. This may further be beneficial in (game) situations wherein it is desired that a first mobile device changes the appearance and/or behavior of a virtual object for a second mobile device. The light detector 102 of the mobile device 100 may further detect the updated embedded code and the processor 102 may determine an updated appearance and/or an updated behavior of the virtual object based on the updated embedded code and render the virtual object accordingly. The updated embedded code may, for example, comprise instructions for the processor 102 to change the color/shape/size of a virtual object, to increase/reduce the movement speed of the virtual object, to change the movement trajectory of the virtual object, to increase/reduce the lifetime of the virtual object, etc.

Figure 4:
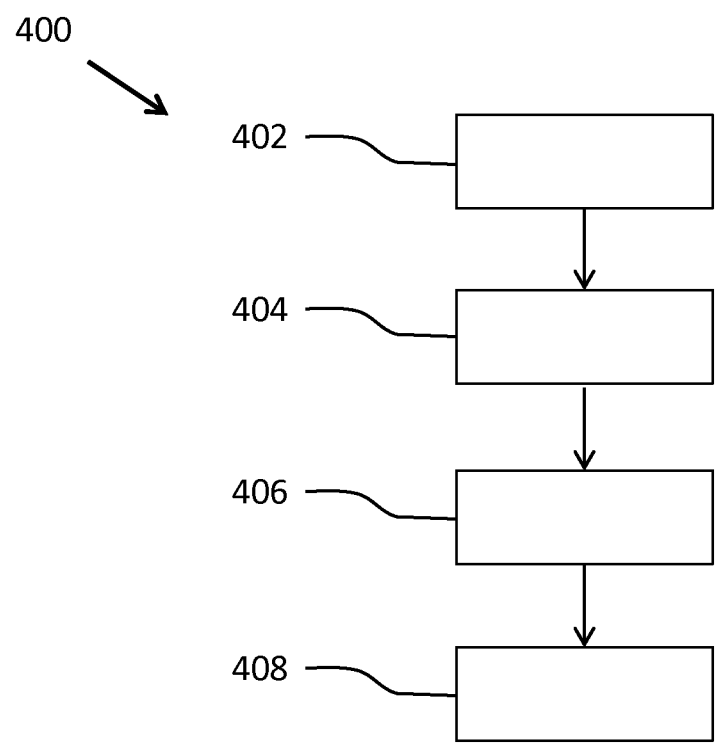
FIG. 4 shows schematically a method of rendering virtual objects.

FIG. 4 shows schematically a method 400 of rendering virtual objects. The method 400 comprises:

detecting 402 light emitted by a lighting device 120, which light comprises an embedded code representative of a property of the lighting device 120, selecting 404 a virtual object (e.g. from a memory 106, based on the embedded code of the light emitted by the lighting device 120, etc.), determining 406 an appearance and/or a behavior of the virtual object based on the property of the lighting device 120, rendering 408 the virtual object on an image rendering device 104 according to the determined appearance and/or behavior.

The method 400 may be executed by computer program code of a computer program product when the computer program product is run on a processing unit of a computing device, such as the processor 102 of the mobile device 100.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of rendering objects on a mobile device as an overlay on a view of a physical environment, the mobile device comprising an image rendering device, the method comprising:

detecting light emitted by a lighting device located in the view, said light comprising an embedded code representative of a property of the lighting device, obtaining a virtual object, determining an appearance and/or a behavior of the virtual object by correlating the determined appearance and/or behavior primarily to the property of the lighting device, and rendering the virtual object on the image rendering device according to the determined appearance and/or behavior.

2. The method of claim 1, wherein the property relates to at least one of:

a beam shape of the light emitted by the lighting device,
a shape of the lighting device,
an identifier of the lighting device,
a type of the lighting device,
a light setting of the lighting device, and
a location and/or an orientation of the lighting device.

3. The method of claim 1, wherein the appearance relates to at least one of:

a size of the virtual object,
a shape of the virtual object,
a color of the virtual object, and
a transparency of the virtual object.

4. The method of claim 1, wherein the behavior relates to at least one of:

a movement of the virtual object,
a movement speed of the virtual object,
a trajectory of the virtual object, and
a lifetime of the virtual object.

5. The method of claim 1, wherein the property is a first property and the lighting device is a first lighting device, and wherein the method further comprises detecting second light emitted by a second lighting device, wherein said second light comprises a second embedded code representative of a second property of the second lighting device, and wherein the appearance and/or the behavior of the virtual object is based on the first property of the first lighting device and the second property of the second lighting device.

6. The method of claim 1, wherein the image rendering device is comprised in a mobile device comprising an image capture device, and wherein the method further comprises:

identifying an object in an image captured by the image capture device, determining a first position of the object in the image, and rendering the virtual object at a second position on the image rendering device based on the first position of the object in the image.

7. The method of claim 1, wherein the image rendering device is comprised in a mobile device comprising an image capture device, and wherein the method further comprises:

determining a first position of the lighting device in an image captured by the image capture device, and rendering the virtual object at a second position on the image rendering device based on the first position of the lighting device in the image.

8. The method of claim 7, wherein the method further comprises:

determining a third position of the second lighting device in a field of view of the image capture device, determining a movement trajectory for the virtual object based on the first position of the lighting device and the third position of the second lighting device, and rendering the virtual object on the image rendering device according to the determined movement trajectory.

9. The method of claim 1, further comprising:

controlling the lighting device such that the lighting device emits light comprising an updated embedded code, wherein said updated embedded code is representative of an instruction for a change of the appearance and/or the behavior of the virtual object, and detecting the updated embedded code, determining an updated appearance and/or an updated behavior of the virtual object based on the updated embedded code, and rendering the virtual object on the image rendering device according to the updated appearance and/or the updated behavior.

10. The method of claim 1, wherein the obtaining the virtual object comprises selecting the virtual object from a memory based on the property of the lighting device.

11. The method of claim 1, wherein the virtual object is a virtual character.

12. A non-transitory computer readable medium comprising computer program code configured to cause a processor to perform the method of claim 1 when the processor executes the code.

13. A system for rendering objects, the system comprising:

an image rendering device for rendering the objects as an overlay on a view of a physical environment, a light detector configured to detect light emitted by a lighting device located in the view, wherein said light comprises an embedded code representative of a property of the lighting device, and a processor configured to obtain a virtual object, determine an appearance and/or a behavior of the virtual object by correlating the determined appearance and/or behavior primarily to the property of the lighting device, and render the virtual object on the image rendering device according to the determined appearance and/or behavior.

14. The system of claim 13, further comprising an image capture device, and wherein the processor is configured to determine a position of the lighting device and/or an object in a field of view of the image capture device, and to determine where to render the virtual object on the image rendering device based on the position of the lighting device and/or the object in the field of view of the image capture device.

* * * * *